United States Patent
Pinard et al.

[19]

[11] Patent Number: 5,815,811
[45] Date of Patent: Sep. 29, 1998

[54] PREEMPTIVE ROAMING IN A CELLULAR LOCAL AREA WIRELESS NETWORK

[75] Inventors: Patrick Pinard, Santa Clara; Frederic Heiman, Los Gatos, both of Calif.

[73] Assignee: Symbol Technologies, Inc., Holtsville, N.Y.

[21] Appl. No.: 549,051

[22] Filed: Oct. 27, 1995

Related U.S. Application Data

[63] Continuation-in-part of Ser. No. 44,648, Apr. 8, 1993, Pat. No. 5,528,621, which is a continuation-in-part of Ser. No. 799,172, Nov. 27, 1991, Pat. No. 5,280,498, which is a continuation-in-part of Ser. No. 635,859, Dec. 28, 1990, Pat. No. 5,142,550, which is a continuation-in-part of Ser. No. 374,452, Jun. 29, 1989, Pat. No. 5,029,183.

[51] Int. Cl.$^6$ ............................. H04M 11/00; H04Q 7/00
[52] U.S. Cl. ........................... 455/434; 455/525; 375/202
[58] Field of Search ..................... 379/59, 61; 455/33.2, 455/34.1, 56.2, 54.2, 403, 466, 434, 457, 455, 88; 370/338, 232, 332, 250, 349; 235/472, 375; 375/202, 200

[56] References Cited

U.S. PATENT DOCUMENTS

| | | | |
|---|---|---|---|
| 5,212,806 | 5/1993 | Natarajan | 455/33.4 X |
| 5,243,641 | 9/1993 | Evans et al. | 379/61 |
| 5,295,154 | 3/1994 | Meier et al. | 370/338 X |
| 5,303,240 | 4/1994 | Borras et al. | 370/347 |
| 5,329,531 | 7/1994 | Diepstraten et al. | 370/338 X |
| 5,448,569 | 9/1995 | Huang et al. | . |
| 5,461,627 | 10/1995 | Rypinski | 370/346 |
| 5,465,398 | 11/1995 | Flammer | 455/67.1 |
| 5,471,469 | 11/1995 | Flammer, III et al. | 370/346 |
| 5,513,210 | 4/1996 | Vook et al. | 375/202 |
| 5,644,576 | 7/1997 | Bauchot et al. | 370/437 |

FOREIGN PATENT DOCUMENTS

| | | |
|---|---|---|
| 0 268 375 A2 | 5/1988 | European Pat. Off. . |
| 0 483 544 A1 | 10/1991 | European Pat. Off. . |
| 0 578 374 A1 | 1/1994 | European Pat. Off. . |
| WO 93/01663 | 1/1993 | WIPO . |

*Primary Examiner*—David R. Hudspeth
*Assistant Examiner*—Scott Richardson
*Attorney, Agent, or Firm*—Kirschstein, et al.

[57] ABSTRACT

A communications network comprising a cellular local area wireless network includes a plurality of access points connected to a housed computer and each other, and a plurality of mobile units each mobile unit being arranged for association with an access point. The mobile units are arranged to periodically scan for and identify the most eligible access point for association on the basis of the criteria of best quality signal strength and loading factor. In order to identify when mobile units are being removed from a predetermined area, access points having directional antennae are situated adjacent exit points to detect when mobile units are in a vicinity.

31 Claims, 4 Drawing Sheets

PREEMPTIVE ROAMING IN A CELLULAR LOCAL AREA WIRELESS NETWORK

REFERENCE TO RELATED APPLICATIONS

This application is a continuation-in-part of application Ser. No. 08/044,648, filed Apr. 8, 1993, now U.S. Pat. No. 5,528,621, which was a continuation-in-part of Ser. No. 07/799,172, filed Nov. 27, 1991, now U.S. Pat. No. 5,280,498 which was a continuation-in-part of application Ser. No. 07/635,859, filed Dec. 28, 1990, now U.S. Pat. No. 5,142,550, which was a continuation-in-part of application Ser. No. 07/374,452, filed Jun. 29, 1989, now U.S. Pat. No. 5,029,183, issued Jul. 2, 1991. This application is related to application Ser. No. 08/344,737, filed Nov. 23, 1994 and Ser. No. 08/193,069, filed Jan. 18, 1994, now abandoned on May 13, 1995.

BACKGROUND OF THE INVENTION

1. Field of the Invention

The invention relates generally to preemptive roaming among cells in a cellular network. In particular the invention relates to a local area wireless network including a plurality of mobile units and a plurality of access points.

2. Description of the Related Art

Wireless local area networks (LAN'S) are used in business applications such as inventory, price verification markdown, portable point of sale, order entry, shipping, receiving and package tracking. Such systems are often proprietary systems wherein the operator carries a mobile unit such as a hand-held computer communicating with a house computer via one of a plurality of access points connected to the house computer and to one another, each access point interacting with the house computer to create a wireless cell.

In order to achieve inter-operability of the various proprietary systems a draft standard IEEE 802.11 has been proposed (the IEEE 802.11 draft specification is available for public inspection).

The draft standard includes features such as 1 Mbps and 2 Mbps data rates, carrier sense multiple access/collision avoidance (CSMA/CA), a power-save mode for battery-operated mobile stations, seamless roaming in a full cellular network, high throughput operation, diverse antenna systems designed to eliminate "dead spots", and an easy interface to existing network infrastructures.

The term "roaming" relates to the scanning by each mobile unit of all access points to identify and associate with an eligible access point. Roaming between cells provides great flexibility and is particularly advantageous in locations that are difficult to wire, for simple relocation of work stations, and for portable work stations. The IEEE 802.11 protocols supports either direct-sequence or frequency-hopping spread-spectrum systems, as well as infrared communications. Each access point executes a unique hopping pattern across 79 non-overlapping frequencies at a rate of one hop every 100 milliseconds, 66 hopping patterns being specified in the IEEE 802.11 draft standard and being selected to minimise the possibility of interference. Frequency hopping spread-spectrum systems are preferred by the majority of users as they allow increased capacity and decreased interference.

Although the IEEE 802.11 draft specification provides the basic packet types which can enable roaming it does not actually set the roaming algorithm. According to the draft specification the mobile unit determines the access point with which it will associate and the access point must accept the mobile unit unless it is defective or certain alarm conditions exist, such as memory full. There is, however, no suggestion of how, or by what criteria, other than those mentioned above, the mobile unit might select an appropriate access point, or the optimum access point.

U.S. Pat. No. 5,276,680 relates to a communication system including a plurality of portable units and a plurality of controllers wired to a network. Each portable unit polls all of the controllers to establish whether it can associate with any controller and receives a response from any controller having less than a predetermined number of portable units already associated therewith.

SUMMARY OF THE INVENTION

1. Objects of the Invention

It is an object of the present invention to provide a communication system allowing improved selection by a mobile unit of an access point for association.

It is a further object of the present invention to provide a communication system allowing selection by a mobile unit of an access point to provide optimum operation of the system.

It is a further object of the present invention to provide a communication system providing information concerning the physical location of a mobile unit.

It is a further object of the present invention to provide a communication system adapted to prevent mobile units from being taken outside a given physical area.

2. Features of the Invention

According to the invention there is provided a data communications network including a plurality of stationary access points and a plurality of mobile units, a mobile unit being capable of communicating with at least two access points in a predetermined range therefrom, comprising:

means in the mobile unit to scan for and associate the mobile unit with the most eligible access point at predetermined intervals, the most eligible access point being selected according to each of the following criteria:

(a) received access point signal quality; and (b) loading factor at the access point.

Accordingly, a simple and reliable arrangement is provided enabling preemptive roaming and optimum selection of an access point for association with a mobile unit.

Each mobile unit may select a group of eligible access points and select the most eligible access point from that group. The received access point signal quality may be represented by the received signal strength indication (RSSI). The loading factor may be defined by the number of mobile units associated with a given access point. The cellular communications network may comprise a 1 Mbps frequency-hopping spread-spectrum wireless LAN conforming to the IEEE 802.11 draft specification.

Each mobile unit may send out a probe message packet to all access points wherein the probe packet has no destination address but a mobile unit specific source address. The probe packet may include an identification of the access point with which the mobile unit is currently associated. Each access point that detects the probe packet may send a probe response packet containing the following information:

access point address;
access point frequency hopping pattern;
access point present channel;
time remaining in present channel;
loading factor.

The mobile unit may carry out its selection on the basis of the signal quality of, and information contained in the received probe response packets or the access point signal quality may be determined from a beacon signal sent by the access point independently of a probe response packet.

Each mobile unit may store the RSSI value for each access point and calculate an average value over a predetermined period, and RSSI values outside a predetermined range may be omitted from the averaging calculation.

Each mobile unit may carry out a full scan of all available frequency channels on power-up and thereafter at regular intervals. The full scan may be carried out at approximately thirty second intervals. Each mobile unit may carry out a partial scan of known access points at regular intervals more frequently than a full scan is carried out, for example at approximately five second intervals.

Each mobile unit not associated with an access point may identify on scanning all access points with signal quality equal to or above a threshold value and select for association the access point having the lowest loading factor; when two or more access points have an equal lowest loading factor the access point having the highest RSSI value may be selected. The threshold value may be set at six counts below the highest detected RSSI value.

A mobile unit associated with an access point and experiencing an unacceptably low communication level may roam excluding the current access point from selection. The unacceptably low communication level may be achieved when more than 50% retries, CRC errors or missed beacons are experienced. The excluded access point may be re-included for selection when its RSSI value has increased by a predetermined limit. If no eligible access points are identified for re-association the mobile unit may continue to associate with the current access point.

A mobile unit associated with an access point and achieving a satisfactory level of communication may make a scanning decision at predetermined intervals. A satisfactory communication level may be achieved when 50% or less retries, CRC errors or missed beacons are experienced. An eligible group may be selected comprising all access points with signal quality above a predetermined threshold, the group including the current access point when its signal quality is above a further predetermined threshold, and the access point may be selected having the lowest loading factor; access points having a loading factor of more than a given proportion of the current access point loading factor may be excluded and where two or more access points have the same loading factor, the access point having the highest signal quality may be selected. The eligible group threshold value may be six counts below the highest received RSSI value, the current access point further threshold value may be eleven counts below that RSSI value, and access points having a loading factor of more than 75% of the current access point loading factor may be excluded.

Each mobile unit may carry out a partial scan of known access points at predetermined intervals and may carry out the roaming decision immediately after the partial scan.

The communications network may be included in one of an inventory, price verification, mark-down, portable point of sale, order entry, shipping, receiving and package tracking systems.

According to the invention there is further provided a mobile unit for use in a cellular communications network comprising a plurality of access points, the mobile unit including a communications system for association with an access point and a selection system for scanning all access points, selecting a group of eligible access points for association and selecting from that group a most eligible access point, selection being carried out according to the following criteria:

a received access point signal quality; and
loading factor.

According to the invention there is further provided a cellular communications network comprising a plurality of mobile units and a plurality of access points, the mobile unit being arranged to roam and associate with a selected access point, the mobile unit including a selection system for selecting a group of eligible access points for association and selecting from that group the most eligible access point, selection being carried out according to the following criteria:

received access point signal quality; and
loading factor.

According to the invention there is further provided a method of operation of a cellular communications network, the network including a plurality of access points in communication with each other and a plurality of mobile units wherein:

each mobile unit scans for and associates with the most eligible access point at predetermined intervals, each mobile unit selecting a group of eligible access points and, from that group, selecting the most eligible access point according to the following criteria:

received access point signal quality; and
loading factor.

According to the invention there is yet further provided a data communications network including a plurality of stationary access points and a plurality of mobile units wherein:

each mobile unit scans for and selects as eligible access point for association therewith on the basis of received access point signal quality and loading factor at the access point and wherein:

a physical area is defined within which all mobile units must be kept and access points are provided adjacent the or each exit point from the physical area.

The access point at the exit point may include a directional (horn) antenna providing a strong signal in the vicinity of the exit point.

The novel features which are considered as characteristic of the invention are set forth in particular in the appended claims. The invention itself, however, both as to its construction and its method of operation, together with additional objects and advantages thereof, will best be understood from the following description of a specific embodiment, when read in conjunction with the accompanying drawings. It is to be understood that the invention may be carried into practice in a number of ways, and the described embodiment is not intended to be limiting.

BRIEF DESCRIPTION OF THE DRAWING(S)

DETAILED DESCRIPTION OF THE PREFERRED EMBODIMENT

Figure 1:
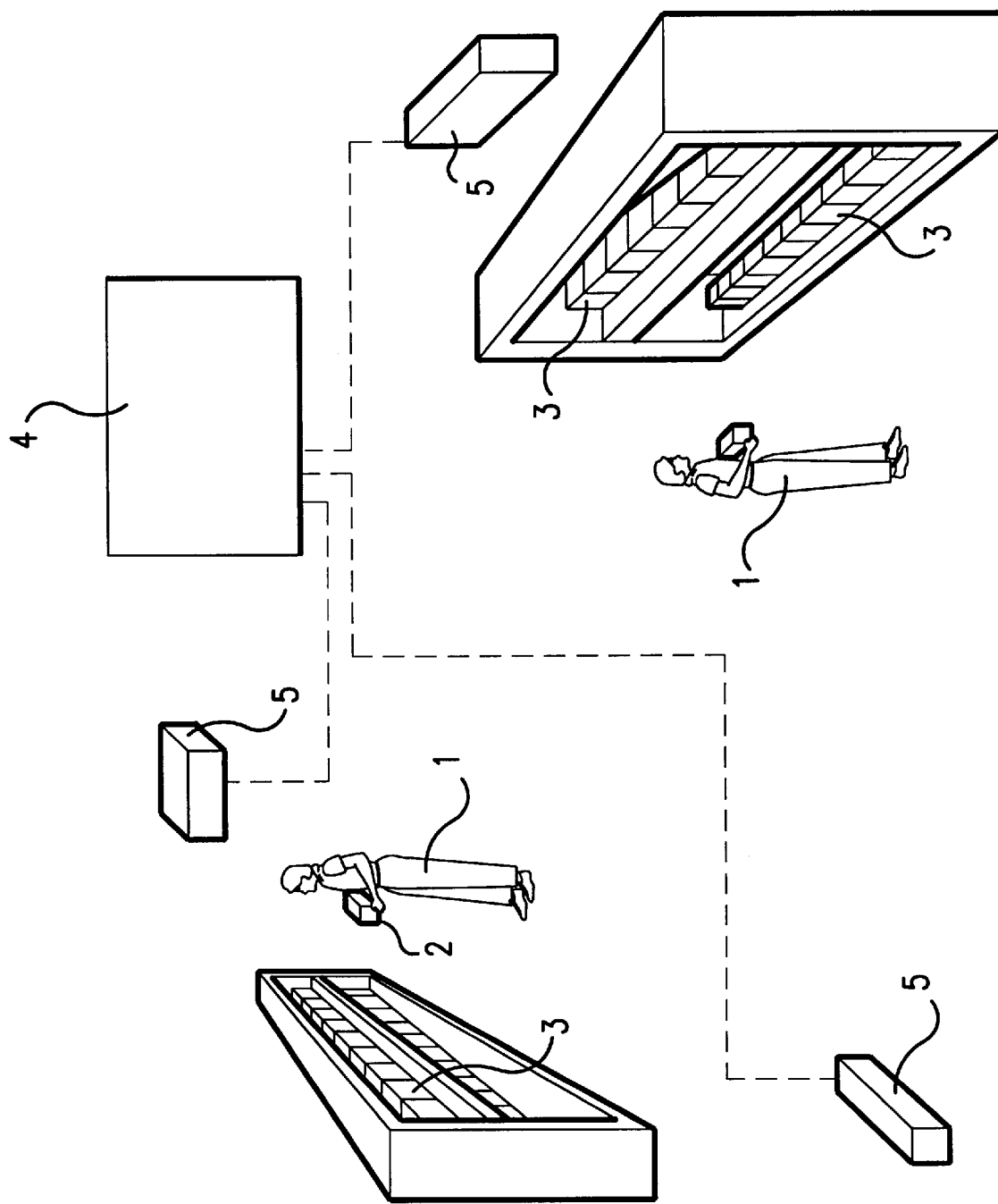
FIG. 1 is a schematic illustration showing the communication system of the present invention in operation.
Figure 2A:
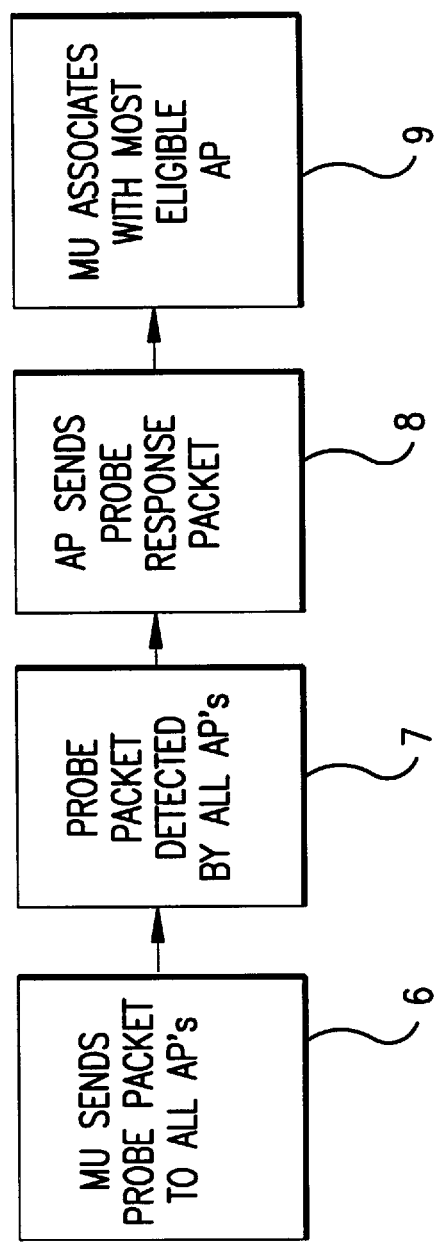
FIG. 2a is a block diagram illustrating the steps carried out by a mobile unit during the roaming process.
Figure 2B:
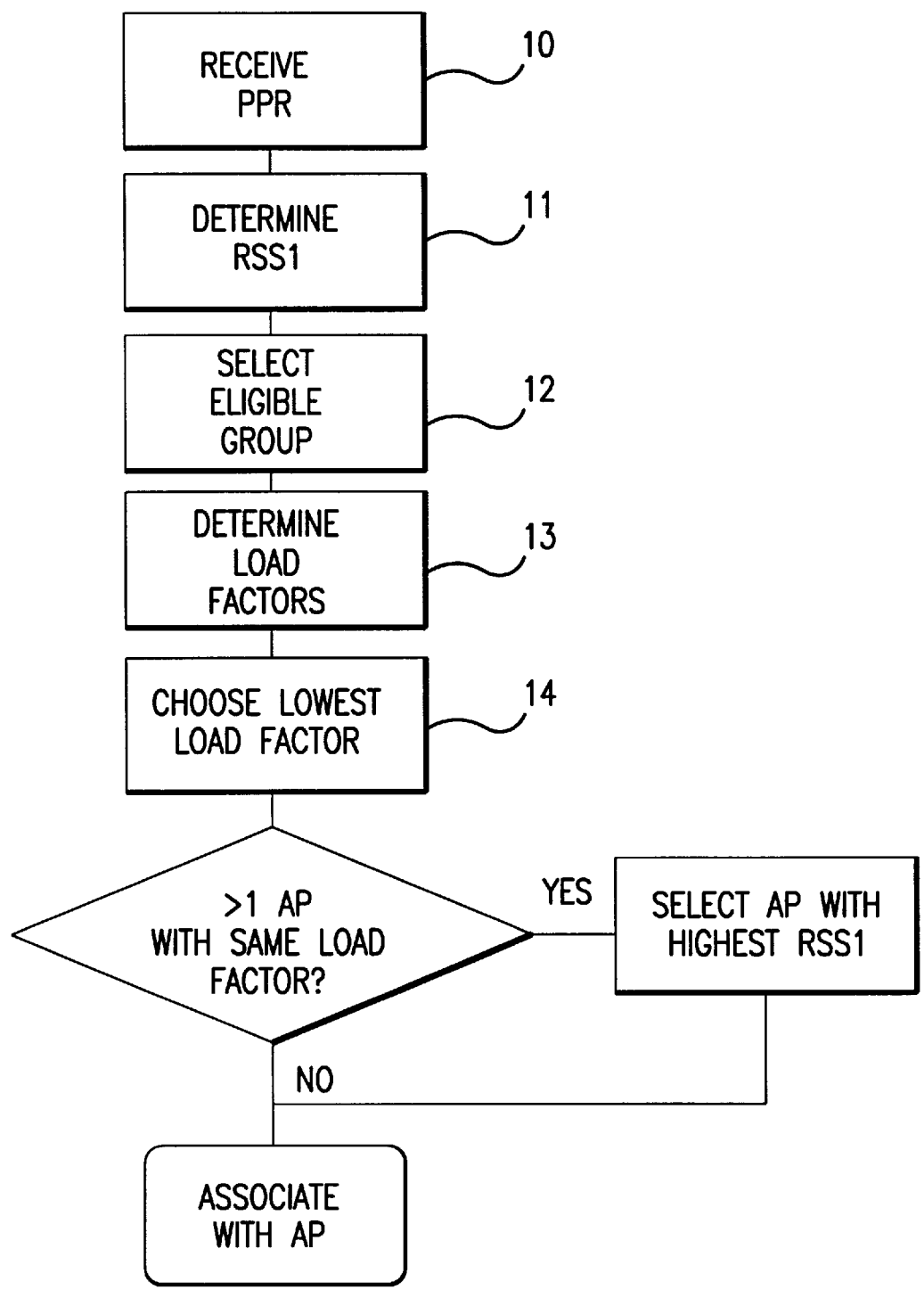
FIG. 2b is a flow chart illustrating the steps carried out by a mobile unit for selection of the most eligible access point.

Referring to FIG. 1 one application of a cellular wireless communication system is in the field of inventorying. One or more operators 1 each carry a mobile unit 2, such as a portable computer. Information concerning the items 3 to be inventoried is entered into the mobile unit 2, for example by scanning bar code symbols on the items 3. In order to communicate the information obtained to a backbone house computer 4 a plurality of access points 5 are provided each connected to the house computer 4 and one to another, each access point 5 together with the backbone house computer 4 forming a cell. Depending on the location of the operator 1 it is desirable that the mobile unit should select the optimum access point; in addition, if conditions change, for example if the operator 1 changes position, it is desirable that the mobile unit 2 should, if necessary, re-associate with a new access point if the current access point 5 does not allow a satisfactory performance or the new access point offers an improved performance. The mobile unit 2 and access points 5 are arranged for wireless communication at radio frequencies, for example, 2.4 GHz in the industrial scientific medical (ISM) band. The steps carried out by a mobile unit 2 which is not currently associated to an access point in selecting an access point are shown in FIGS. 2a and 2b. As shown in the block diagram of FIG. 2a the mobile unit (MU) firstly sends out a probe packet (6) to all access points (AP). The probe packet contains the mobile unit source address but has no destination address and hence any access point that detects the probe packet must send a response. Accordingly, the probe packet is detected by all access points within range (7) and each of those access points sends out a probe response packet (8).

Figure 3:
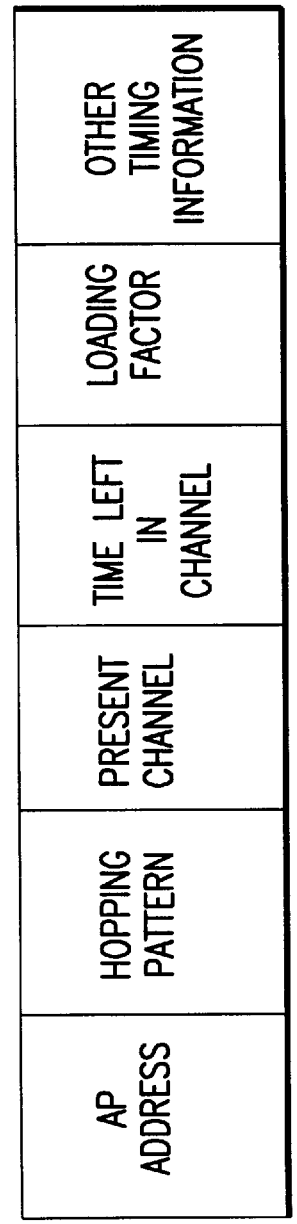
FIG. 3 shows a probe response message typically sent by an access point according to the present invention.

The form of the probe response packet is shown in FIG. 3. The information contained therein includes the access point address, the hopping pattern, the present channel, time left in the present channel, the loading factor (discussed in more detail below) and any other timing information that may be required. Returning to FIG. 2a the mobile unit associates with the most eligible access point based on the probe response packets that it receives.

Referring to FIG. 2b the mobile unit selects the most eligible access point in the following manner:

As each probe packet response (PPR) is received (10) the signal quality of the response is measured by determining the received signal strength indication (RSSI) (11). For reference, RSSI values generally vary from 25 to 60, with good communications experienced above approximately 35. In practice, rather than relying on a single instantaneous value, the RSSI information for each access point is placed in a table in the memory of the mobile unit and is updated each time a probe response packet is received from that access point. In order to minimise fluctuation the RSSI value for each access point in the table is averaged over a predetermined number of responses. It has been found that large variations in the RSSI values for a given access point have been recorded even when measured by a stationary mobile unit, varying by as much as 15 counts over one minute, and in order to reduce the range of values and minimise "slow thrashing" (when "thrashing", a mobile unit associates with a first access point, then roams to a second access point after a short period of time and then further access points in a random manner without any long attachment to a single access point and "slow thrashing" may be interpreted accordingly) the averaging calculation may include the step of discarding values outside a given range, for example ten or more counts below the average RSSI value.

Once the RSSI values have been calculated, an "eligible group" of access points is selected (12), including all access points having an RSSI value no more than six counts below the best detected RSSI value. From that group the access point having the lowest load factor (LF) is determined (13,14). The load factor is a measure of how many mobile units are currently associated with a given access point; in the present case the load factor is represented by a simple numerical value representing the exact number of associated mobile units. The access point thus selected is the most eligible access point and the mobile unit then selects that access point for association. If more than one access points within the eligible group exhibit the same load factor then, of those, the access point having the highest RSSI value is selected as the most eligible access point and the mobile unit associates with that access point.

The mobile units are programmed to carry out an update probe at predetermined intervals. In the present embodiment each mobile unit carries out a full scan, probing all seventy nine channels, upon power up and every thirty seconds. Full scans last approximately 100 ms. In addition partial scans, covering known access points, are performed every five seconds. The probe response packet transmitted by an access point contains all necessary synchronisation information for a mobile unit to latch on to the current channel of the access point and follow the hopping pattern at any stage. In an alternative arrangement the RSSI value for the access point is calculated not from the strength of the probe response signal but from the strength of the "beacon packet" issued by the access point. Each access point issues a beacon packet every 100 milliseconds containing, in addition to other information, timing information similar to that contained in the probe response packet.

A slightly different approach is taken where a mobile unit is currently associated with an access point but at a communication level that is unsatisfactory. An unsatisfactory communication level may be identified, for example, when more than fifty per cent retries, cyclic redundancy code (CRC) errors or missed beacons are detected. In that case the mobile unit will re-associate using the steps illustrated in FIGS. 2a and 2b except that the access point with which the mobile unit was experiencing poor communications will be excluded from the eligible group of access points (see step (12) of FIG. 2b). The in-eligible access point can, however, in due course be re-admitted to the eligible group after a succession of acceptable RSSI values have been observed. It should be noted that a mobile unit experiencing poor communication will re-associate only if an eligible access point is identified.

In cases where a mobile unit is not experiencing an unsatisfactory communications level (as defined above) it makes a roaming decision every five seconds after a partial scan. Once again the steps described above with reference to FIG. 2b are carried out, but with the following modifications:

1. The current access point is included in the eligible group if its RSSI value is no more than eleven counts below the best RSSI value.
2. When choosing the access point having the lowest loading factor in the group, access points having a loading factor which is more than 75% of the loading factor of the current access point loading factor are excluded.

The additional steps enable the mobile unit to avoid "frivolous roaming" that is to say, re-association with new access points when the current access point is in fact satisfactory.

The system thus allows preemptive roaming providing for dynamic load balancing, that is, a mobile unit may re-associate with a new access point although it is not experiencing poor communications with a current access point, but the newer access point will offer considerably improved communications. The possibility of a mobile unit losing contact with an access point altogether and experiencing periods where it is not communicating with any access points, may thus be avoided.

In addition, the system has been improved by adjusting the sensitivity so that a mobile unit will not tend to roam from a current associated access point to another at the rate that it would otherwise, where the signal strengths of various access points are similar in magnitude. Accordingly, greater stability is achieved.

In a further modification the probe packet may include an identification of the access point that the mobile unit is currently associated with for example, the BSS ID. Such an arrangement would be more reliable than the messages passed between access points relaying re-association events.

Figure 4:
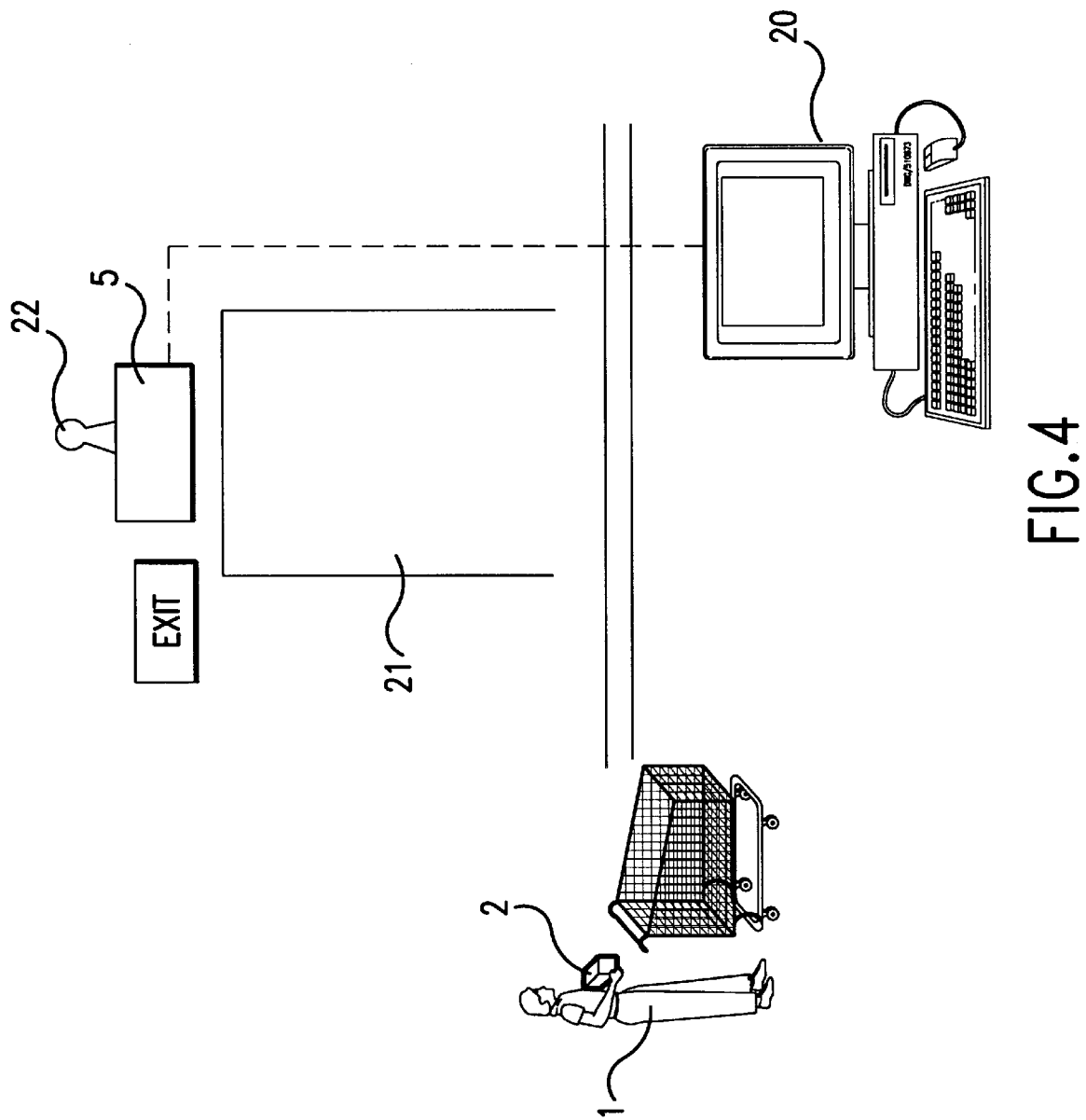
FIG. 4 is a schematic illustration showing a further embodiment of the communication system of the present invention.

A further embodiment of the invention is shown in FIG. 4. In some cases it may be desirable to provide information concerning the physical location of a mobile unit. For example the information may be provided to a system administrator 20 who may take action based on the information. Alternatively the house computer 4 may take action automatically on the basis of certain information.

For example, mobile units are often used in stock exchanges by traders for receiving orders and executing trades, as it is illegal to execute trades outside the building. In order, therefore, to determine whether a mobile unit is being removed from the building, access points 5 are provided adjacent each exit door 21. Each access point 5 is equipped with a directional (horn) antenna 22 designed to provide a strong signal over a narrow pattern in the vicinity of and covering the whole of the doorway. According to the roaming operation of the mobile units discussed above, any mobile unit will associate with an access point having high signal quality and which is lightly loaded and hence any mobile unit passing an access point 5 over an exit door 21 (when a mobile unit is being taken through the door) will associate with that access point. Once the system has detected that a mobile unit has associated with an access point over an exit door 21 the necessary steps can be taken by a house computer. For example an alert can be sounded which may in addition disable operation of the mobile unit. It is, of course, possible to identify which exit door the mobile unit was being taken through by identifying the physical location of the associated access point.

In the embodiment shown in FIG. 4 a cellular communications network is in use in a self-checkout retail system where wireless mobile units are provided to customers for the purpose of scanning their own purchases, for example, using bar code symbols. In that case an access point 5 provided over an exit 21 could be used to alert the store management 20 that a scanner was leaving the premises and to sound an alarm at the door.

Without further analysis, the foregoing will so fully reveal the gist of the present invention that others can readily adapt it for various applications without omitting features that, from the standpoint of prior art, fairly constitute essential characteristics of the generical or specific aspects of this invention and, therefore, such adaptions should and are intended to be comprehended without the meaning and range of equivalence of the following claims.

We claim:

1. A data communications network including a plurality of stationary access points operatively connected to a host and a plurality of mobile units, said network comprising:

a) each of the mobile units using frequency hopping spread spectrum radio frequency communications, and including a transmitter for broadcasting a probe packet to all of the access points in a predetermined range from one of the mobile units that is broadcasting the probe packet, b) said access points within said range including respective receivers for detecting the probe packet being broadcast, and for responsively sending probe response packets back to said one of the mobile units, and c) a selector in each of the mobile units to select a most eligible one of the access points from said probe response packets, and to associate said one of the mobile units with the most eligible one of the access points at predetermined intervals, the most eligible one of the access points being selected according to received signal quality at said one of the mobile units, and a loading factor at each of the stationary access points.

2. The network as claimed in claim 1, in which said one of the mobile units selects a group of said plurality of the stationary access points and selects the most eligible one of the access points from said group.

3. The network as claimed in claim 1, in which the received signal quality is represented by a received signal strength indication (RSSI) value.

4. The network as claimed in claim 1, in which the loading factor is defined by the number of said mobile units associated with each of the stationary access points.

5. The network as claimed in claim 1, in which the communications network comprises a 1 Mbps frequency-hopping spread-spectrum wireless LAN conforming to the IEEE 802.11 draft specification.

6. The network as claimed in claim 1, in which each of the probe packets has no destination address but a mobile unit specific source address.

7. The network as claimed in claim 6, wherein each of the probe packets includes an identification of the stationary access point with which a respective one of the mobile units is currently associated.

8. The network as claimed in claim 6, in which each of the probe response packets contains an access point address, the frequency hopping pattern, an access point in a present channel, a time remaining in the present channel, and the loading factor.

9. The network as claimed in claim 8, in which said one of the mobile units carries out its selection on the basis of the signal quality of, and information contained in, the received probe response packets.

10. The network as claimed in claim 1, and further comprising a reader in each of the mobile units to read bar code symbols on targeted items, and to automatically enter data relating to the symbols into the mobile units.

11. The network as claimed in claim 3, in which said one of the mobile units stores the RSSI value for each of the stationary access points and calculates an average value over a predetermined period.

12. The network as claimed in claim 11, in which the RSSI values outside a given range are omitted from the averaging calculation.

13. The network as claimed in claim 1, in which said one of the mobile units carries out a full scan of all available frequency channels on power-up and thereafter regularly at said predetermined intervals.

14. The network as claimed in claim 13, in which the full scan is carried out at thirty second intervals.

15. The network as claimed in claim 13, in which said one of the mobile units carries out a partial scan of a group of said stationary access points at regular given intervals more frequently than said predetermined intervals in which the full scan of all of said frequency channels is carried out.

16. The network as claimed in claim 15, in which said one of the mobile units carries out the partial scan at five second intervals.

17. The network as claimed in claim 1, in which said one of the mobile units identifies all said stationary access points with a signal quality at least equal to a threshold value, and selects for association the most eligible one of the access points having the lowest loading factor, and in which, when a plurality of said stationary access points has an equal lowest loading factor, the stationary access point having the highest received signal quality is selected.

18. The network as claimed in claim 17, in which the threshold value is set below the highest received signal quality.

19. The network as claimed in claim 1, in which one of said plurality of the mobile units, associated with one of said stationary access points and experiencing an unacceptably low signal quality, roams and excludes said one of the stationary access points from selection.

20. The network as claimed in claim 19, wherein the unacceptably low signal quality is achieved when more than 50% retries, CRC errors or missed beacons are experienced.

21. The network as claimed in claim 19, in which the excluded one of the stationary access points is re-included for selection when the received signal quality exceeds a predetermined limit.

22. The network as claimed in claim 19, in which, if none of the stationary access points is identified for re-association, said one of the mobile units continues to associate with a current one of the stationary access points.

23. The network as claimed in claim 3, in which each of the mobile units, associated with a current one of the stationary access points and achieving a satisfactory level of communication, makes a selection decision at selected intervals.

24. The network as claimed in claim 23, in which the satisfactory communication level is achieved when 50% or fewer retries, CRC errors or missed beacons are experienced.

25. The network as claimed in claim 23, in which an eligible group of said stationary access points is selected from all the stationary access points having a signal quality above a predetermined threshold; the group including a current one of the stationary access points having a signal quality above a further predetermined threshold; and the most eligible access point being selected from all the stationary access points having the lowest loading factor; wherein the stationary access points having a loading factor of more than a given proportion of the loading factor of the current one of the stationary access points are excluded; and wherein, when a plurality of the stationary access points has the same loading factor, the stationary access point having the highest signal quality is selected as the most eligible access point.

26. The network as claimed in claim 25, in which the predetermined threshold of the eligible group is below the highest received RSSI value, in which the further predetermined threshold of the current one of the stationary access points is further below said highest received RSSI value, and in which the stationary access points having a loading factor of more than 75% of the loading factor of the current one of the stationary access points are excluded.

27. The network as claimed in claim 23, in which each of the mobile units carries out a partial scan of the stationary access points at given intervals and performs roaming immediately after the partial scan.

28. The network as claimed in claim 1, in which the communications network is included in one of an inventory, price verification, mark-down, portable point of sale, order entry, shipping, receiving and package tracking system.

29. A method of operating a cellular communications network including a plurality of access points in communication with each other and operatively connected to a host, and a plurality of mobile units, comprising the steps of:

a) broadcasting a probe packet to all of the access points in a predetermined range from one of the mobile units that is broadcasting the probe packet, each of the mobile units using frequency hopping spread spectrum radio frequency communications;

b) detecting the probe packet being broadcast, and responsively sending probe response packets from the access points within said range back to said one of the mobile units;

c) minimizing interference among the probe response packets;

d) scanning the plurality of the access points at predetermined intervals; and e) selecting a group of eligible ones of the access points from the plurality of the access points, by selecting a most eligible one of the access points from the group according to received signal quality at said one of the mobile units and loading factor.

30. A data communications network, comprising:

a) a plurality of stationary access points operatively connected to a host, a plurality of mobile units, each of the mobile using frequency hopping spread spectrum radio frequency communications, one of the mobile units including a transmitter for broadcasting a probe packet to all of the access points in a predetermined range from said one of the mobile units that is broadcasting the probe packet, b) said access points within said range including respective receivers for detecting the probe packet being broadcast, and for responsively sending probe response packets back to said one of the mobile units, c) a selector for selecting a most eligible one of the access points from the plurality of the access points on the basis of received signal quality at said one of the mobile units and loading factor at each of the access points, and d) a physical area within which all the mobile units are kept, said area having an exit adjacent which one of the access points is located.

31. The network as claimed in claim 30, in which said one of the access points at the exit includes a directional antenna for transmitting an alarm signal in the vicinity of the exit.

\* \* \* \* \*